3,141,004
TRANSPARENT VULCANIZATE
Ralph F. Wolf, Akron, Ohio, assignor, by mesne assignments, to Pittsburgh Plate Glass Company
No Drawing. Filed Feb. 5, 1960, Ser. No. 6,863
11 Claims. (Cl. 260—41.5)

The present invention relates to a novel composition of matter suitable for use as an improved rubber reinforcing pigment and also to rubber compositions containing such pigments.

It is known that silica in finely divided state having an average ultimate particle size below 0.1 micron is an effective rubber reinforcing pigment. However, one of the objections to finely divided silica when incorporated into rubber compositions resides in the fact that the compositions containing such silica cure at a relatively slow rate. Further, the finally cured compositions often exhibit low strength characteristics. In addition, cured rubber compositions containing finely divided silica tend to exhibit substantial heat build-up when they are subjected to dynamic tension.

In U.S. Patent 2,692,870 there is described a method of minimizing these undesirable characteristics of silica in rubber compositions. According to this method, the silica is coated with an alkylol amine; or an alkylol amine, together with silica, is added to the rubber compounding mixture.

The alkylol amines suitable for this purpose which are disclosed in the aforementioned patent are those which are water miscible and in which the alkyl radical usually contains up to 5 carbon atoms. Typical alkylol amines mentioned in the patent include mono-, di- and tri-methanol amines, mono-, di- and tri-ethanol amines, mono-, di- and tri-propanol amines, mono-, di and tri-isopropanol amines and mono-, di- and tri-butanol amines. Other alkylol amines which may be used are 2-ethylaminoethanol, 2,2-ethyliminodiethanol, 2-di-methylaminoethanol, 2-diethylaminoethanol, 2-butylaminoethanol, 2-isobutylaminoethanol, 2-methylaminoethanol, 2,2-methyliminodiethanol, 2-amino-2,1-propanol, 2-amino-1-butanol, 2-amino - 2 - ethyl - 1,3 - propanediol, 2 - amino - 2 - methyl-1,3-propanediol and 2-amino-2-hydroxymethyl-1,3-propanediol. Higher alkylol amines may also be used provided such amines are water miscible.

According to U.S. Patent 2,692,871, issued October 26, 1954, the undesirable characteristics of silica may also be minimized by coating the finely divided silica with an alkylene polyamine; or by incorporating an alkylene polyamine and silica into a rubber composition. The alkylene polyamines suitable for this purpose are stated to be those which are soluble in water, and in which the alklene radical usually contains up to 5 carbon atoms. Typical alkylene polyamines found to be suitable are indicated to be: ethylene diamine, trimethylene diamine and tetramethylene diamine, diethylene triamine, triethylene tetramine, tetraethylene pentamine and hexamethylene diamine. This patent also teaches that higher molecular weight alkylene polyamines may be used provided they are water miscible.

In U.S. Patent 2,692,869 there is taught still another method of minimizing the undesirable characteristics of silica by coating the finely divided silica with a water miscible polyhydric alcohol; or by incorporating silica and a polyhydric alcohol into the rubber composition. The polyhydric alcohols suitable for this purpose are indicated to be those that are water miscible and which contain no more than 8 carbon atoms. Typical alcohols mentioned include ethylene glycol, diethylene glycol, triethylene glycol, tetraethylene glycol, dipropylene glycol, propylene glycol, glycerol, methyl glycerol, trimethylene glycol, tetramethylene glycol, hexamethylene glycol, pinacol, styrene glycol and the butylene glycols. According to this patent, higher alcohols may also be used, provided such alcohols are water miscible.

The present invention constitutes an improvement over the inventions described in U.S. Patent Nos. 2,692,869, 2,692,870 and 2,692,871. According to this invention, it has been discovered that when small amounts of certain ammonia derivatives are incorporated into silica-filled rubber compositions, the rate of cure and strength characteristics of such silica-loaded rubber compositions are enhanced.

According to one embodiment of the present invention, novel rubbers having high strength properties have been prepared. These rubbers are vulcanizates of mixtures of rubber, reinforcing concentrations of finely divided hydrated silica having an average ultimate particle size in the range of 0.01 to 0.05 micron, and a small amount of a trivalent nitrogen compound which is capable of releasing ammonia or a volatile amine in the mixture at vulcanizing temperatures.

The ammonia derivatives not only enhance the rate of cure and final strength characteristics of the silica-loaded rubber compositions, but also have the unexpected effect of rendering transparent certain finally cured rubber compositions or vulcanizates which ordinarily would be expected to be opaque.

Further, use of the ammonia derivatives taught herein greatly facilitates compounding of rubber stocks meant to be transparent. Heretofore, making transparent silica-filled rubber compositions has required great care in selection of formulation ingredients, as is brought out in U.S. application Serial No. 647,478, filed March 2, 1957, now Patent No. 3,014,883. By using the ammonium derivatives of the present invention, however, standard formulation ingredients may be used in compounding transparent rubber stock, thereby obviating the need to resort to more expensive ingredients. Further, by using the ammonia derivatives, the compositions may be made transparent without the sacrifice of strength characteristics, which heretofore has had to be made.

According to another embodiment of the present invention, therefore, novel transparent rubbers have been prepared. These rubbers are vulcanizates having an opacity below 50 percent of mixtures of rubber, reinforcing concentrations of finely divided, hydrated silica having an average ultimate particle size in the range of 15 to 25 millimicrons and having an index of refraction of substantially 1.46, i.e., 1.45 to 1.465, and a small amount of a trivalent nitrogen compound capable of releasing ammonia or a volatile amine in the mixture at vulcanizing temperatures.

The opacity of rubber compositions is determined using a Hunter Reflectometer. Rubber sheets 0.075 inch in thickness cured between aluminum surfaces to provide clean surfaces are used for testing the opacity. The sheet is placed against a white background and reflectance measured employing a green tristimulus filter to obtain green light reflectance. The sheet is placed against a black background and reflectance measured in the same way. Percent opacity of the sheet is then the ratio of reflectance with black background to reflectance with white background multiplied by 100.

While silica has been used as a reinforcing pigment for many years, few silicas produce a transparent rubber. One type of silica which has been marketed and which has a particle size in the range of 0.03 to 0.04 micron, and which has an index of refraction of 1.44, yields opaque rather than transparent rubber compositions. The type of silica used therefore is important in formulating such compositions.

In order to achieve the desired transparency, it is also necessary to have a proper selection of the other components of the rubber compound so that none of such components impart opacity or seriously impair the transparency of the product. The exact formulation depends to some degree upon the nature of the rubber used. Transparent compositions have been prepared according to this invention using natural rubber, butadiene-styrene copolymers, particularly the oil-extended copymers, butadiene-acrylonitrile copolymers, and butyl rubber.

Heretofore, in the compounding of natural rubber, elemental sulfur had been found to have a bad effect upon the transparency thereof and was therefore kept at a low level, not in excess of about 0.5 to 2 parts by weight per 100 parts by weight of rubber. In order to effect satisfactory vulcanization of natural rubber stocks, small amounts of an organic sulfide which supplied sulfur for vulcanization had to be used in combination with the elemental sulfur. Enough of such sulfide was provided to ensure production of a well-cured stock. The amount required normally was about 0.5 to 3 parts by weight per part by weight of rubber. Best of the polysulfides suitable for this purpose were the dimorpholine polysulfides, such as 4,4'-dithiodimorpholine. Other liquid organic polysulfide vulcanization agents which could be used were the liquid aliphatic polysulfides, such as the liquid ethylene polysulfides. A typical compound of this character is that known as "VA-7," manufactured by the Thiokol Chemical Corporation. Most of the compounds of this character are polymeric products produced by interaction of an alkylene dichloride, such as ethylene dichloride and like olefin dichlorides, with sodium sulfide, ethylene polysulfide, diethyl pentasulfide, alkyl phenol sulfides, and the like.

By using the trivalent nitrogen compounds of the present invention, it has been discovered that elemental sulfur in amounts up to about 3 parts or more by weight per hundred parts by weight of rubber may be used without sacrifice of transparency, and in fact, with considerable improvement in transparency of the stock. Further, organic sulfides to supplement the sulfur content of the vulcanizable composition need not be added to the mixture when such trivalent nitrogen compounds are used.

The accelerator combination used is an important factor in the compounding of transparent natural rubber. The most satisfactory combination consists of a thiazole primary accelerator, a small amount of a dithiocarbamate acting as a secondary accelerator, and an amine activator. Typicl thiazoles which are suitable are: n-cyclohexyl-2-benzothiazole sulfenamide (Santocure), tertiary butyl-2-benzothiazole sulfenamide, mercaptobenzothiazole, mercaptobenzothiazyl disulfide, and the like.

Typical dithiocarbamates are zinc dithiocarbamate, zinc dimethyl dithiocarbamate, zinc n-pentamethylene dithiocarbamate, piperidine pentamethylene dithiocarbamate, selenium diethyl dithiocarbamate, tellurium diethyl dithiocarbamate, zinc diethyl dithiocarbamate, zinc dibutyl dithiocarbamate, and the like.

By far the best results are obtained when the amine activator is hexamethylene tetramine. Other amines which can be used with somewhat poorer transparency are triethanol amine, ethylene diamine, diethanol amine, monoethanol amine, tripropanol amine, dipropanol amine, trimethylene diamine, and like water soluble amines and alkylol amines. Another accelerator combination which can be used together with diethylene glycol or like polyhydric alcohol and an amine, such as hexamethylene tetramine, is dipentamethylene-thiuram-tetrasulfide.

The above materials may be used in small proportions, up to about 1 part by weight per 100 parts by weight of rubber.

Ethylene bis butyl phenol, such as 2,2'-methylene bis (4-ethyl-6-tertiary butyl phenol) and 2,2' bis (4-methyl-6-tertiary butyl phenol) are especially effective antioxidants useful in this composition. Amounts of such antioxidants are in the range of about ½ to 1.5 parts by weight per 100 parts by weight of rubber.

In compounding transparent natural rubber compositions, it has heretofore been necessary to keep the zinc oxide content thereof low, preferably from 0.5 to 1.5 parts by weight of finely divided zinc oxide to 100 parts by weight of rubber.

This was so because the zinc oxide was found to have an opacifying effect on the composition. By using the ammonia derivatives of the present invention, however, zinc oxide contents up to 5 parts by weight per hundred parts of rubber may be used with no adverse effect on transparency, and with considerable enhancement of the physical properties of the vulcanizate. Fatty acids, such as stearic acid and the like may also be present in the mixtures.

According to another embodiment of the present invention, silica pigments having an acid pH may be incorporated into rubber compositions by adding a small amount of the ammonia derivatives taught herein. Heretofore, acid pH silica could not be generally employed in rubber compositions because of its adverse effect on the rate of cure and on the strength characteristics of the finally cured rubber compositions. Accordingly, steps had to be taken to ensure that the silica employed was on the alkaline side. By using the ammonia derivatives disclosed herein, however, it has been discovered that acid pH silica stock may be incorporated into rubber compositions without the adverse effects noted.

According to the standard method of measuring the acidity or alkalinity of silica stock, a 5 percent suspension of silica in water is prepared, and the pH of the suspension is measured. Hereinafter, whenever the pH of the silica stock is referred to, it is to be understood that the pH is measured by the described method.

The ammonia derivatives may be incorporated into the rubber mixture by pre-coating the finely divided silica therewith, or by incorporating the silica and the ammonia derivatives directly into the rubber composition.

Various ammonia derivatives are suitable for this purpose. These ammonia derivatives are trivalent nitrogen compounds which are normally stable solids or liquids at room temperature and which are capable of providing ammonia gas or volatile amines in the rubber composition at vulcanizing temperatures. Vulcanizing temperatures of 240° F. to 300° F. are typical of those contemplated herein.

Suitable trivalent nitrogen compounds which are stable solids or liquids at room temperature and which are capable of providing ammonia gas or volatile amines in the rubber compositions, mixtures or compounds at vulcanizing temperatures include ammonium salts of inorganic or organic acids having up to 8 carbon atoms, preferably ammonium salts of weak inorganic or organic acids having ionization constants measured at 25° C. of less than $2 \times 10^{-5}$, amides or diamides of organic acids which contain up to 8 carbon atoms, esters of the theoretical carbamic acid and mineral acid salts of amines having up to 8 carbon atoms.

Among the ammonium salts of weak organic acids, the ammonium salts of both aliphatic and aromatic carboxylic acids are useful. Typical of these are the ammonium salts of aliphatic monohydric carboxylic acids such as formic, acetic, chloroacetic, propionic, alpha and beta chloropropionic, n-butyric, caproic, glycollic, lactic, thioglycollic, caprylic, pelargonic and like weak acids. Among the aromatic carboxylic acids that form useful ammonium salts are benzoic, o-toluic, m-toluic, m-chlorobenzoic, p-chlorobenzoic, o-chlorobenzoic, m-benzoic, p-bromobenzoic and salicyclic. Thus the useful salts ordinarily contain up to 8 carbon atoms.

Among the ammonium salts of weak inorganic acids, the ammonium salts of carbonic, nitrous, arsenic, selenious and stannic acids are useful.

Among the amides or diamides of organic acids, the amides of both aliphatic (monohydric and dihydric) and aromatic carboxylic acids are useful.

Typical of the organic acid amides are those derived from the aliphatic monohydric carboxylic acids such as formic, acetic, chloroacetic, propionic, alpha and beta chloropropionic, n-butyl caproic, glycollic, lactic, thioglycollic, caprylic, pelargonic, and the like. Also useful are the organic acid amides or diamides derived from the aliphatic dehydric carboxylic acids such as carbonic acid amides or their salts, and the amides and diamides of oxalic acid, malonic acid, succinic acid, glutaric acid, and adipic acid. Among the aromatic carboxylic acid amides that are useful are those derived from benzoic acid, o-toluic acid, m-toluic acid, m-chlorobenzoic acid, p-chlorobenzoic acid, o-chlorobenzoic acid, m-benzoic acid, p-bromobenzoic acid, and salicyclic acid. Useful thus are amides or diamides of such acids, especially those acids having up to 8 carbon atoms.

Among the useful mineral acid salts of amines which are useful may be mentioned the salts of the halogen acids, sulfuric acid, sulfurous acid, phosphoric acid, phosphorous acid, nitric acid and nitrous acid, with primary, secondary and tertiary aliphatic amines such as mono-, di-, and tri-methyl amine, mono-, di- and tri-ethylamine, n-propyl, isopropyl and amyl amines, including mixed amines such as methyl-propylamine, methyl-ethyl-propyl amine and the like. Also useful are salts of the mentioned acids with the aryl derivatives of such aliphatic amines (alkyl-aryl amines) such as benzyl amine and trimethyl-benzyl amine. Also useful are the salts of the mentioned acids with aryl amines that form such salts, such as aniline. Thus the salts that are useful usually contain up to 8 carbon atoms.

Among the preferred trivalent nitrogen compounds for use herein may be mentioned ammonium acetate, ammonium bicarbonate, acetamide, succinamide, trimethyl-benzyl ammonium chloride, urea, urethan, a material identified as HMDA carbonate which is manufactured by the Kellogg Company and described as an "inner salt of omega-amino substituted hexyl carbamic acid," and guanidine carbonate.

As will be brought out hereinafter, the described ammonia derivatives considerably enhance the rate of cure and the strength characteristics of silica-filled rubber compositions, when used alone, or in combination with such activators as alkylene polyamines, alkylol amines, and polyhydric alcohols. The amount of such activators which may be used is capable of some variation. Normally, about 2 to 15 percent of such activators, based upon the weight of the silica, is found to be suitable. While some departure from this range is possible, it is normally found that excessive amounts have an adverse effect upon the properties of the ultimate rubber composition, whereas lower concentrations of such activators are insufficiently effective.

The quantity of the ammonia derivative to be used according to the present invention is also capable of some variation. The ammonium derivative is rarely present in amounts up to about 5 percent by weight of raw rubber in the rubber composition. Ordinarily, the amount of the trivalent ammonium compound does not exceed about 3.5 percent by weight of raw rubber in the rubber composition, and preferably varies from about 1 to 3 percent by weight of the raw rubber in the composition. When amounts of the ammonia derivative outside the ranges described are used, the beneficial effects of the ammonium derivative are lost, or do not appear, and increasing the quantity above the stated upper limit has been found to have an adverse effect on the composition.

An especially desirable reinforcing silica pigment or filler for use herein is prepared by acid precipitation of an alkali metal silicate solution under carefully controlled conditions. The resulting silica generally contains at least 90 to 95° percent by weight $SiO_2$ on an anhydrous basis, i.e., free of "bound water" and "free water." The term "free water" denotes water which may be removed from the silica by heating it at a temperature of 105° C. for a period of 24 hours in a laboratory oven. The term "bound water" is intended to mean the amount of water which is driven off a siliceous pigment by heating the pigment at ignition temperature, for example, 1000° C. to 1200° C., until no further water can be removed, minus the amount of free water in the pigment. The free water content of the silica pigment may vary from about 2 to 10 percent by weight, and the bound water may vary from about 2 to 10 percent by weight, or higher.

Silica of the type contemplated herein generally is pulverulent and has a surface area of 50 to 400 square meters per gram, preferably 85 to 250 square meters per gram. The surface area of the silica may be measured by the Brunauer-Emmett-Teller Method described in the Journal of the American Chemical Society, vol. 60, page 309 (1938).

The silica particles are in the form of flocs of loosely agglomerated particles. Thus, while the ultimate particle size of the precipitated silica as observed by the electron microscope is in the range of 0.01 to 0.05 micron, the floc particle size is larger, usually ranging from 0.1 to 10 microns.

Precipitation of a silica of the type required herein can be effected by the addition of carbon dioxide to sodium silicate solution according to the conditions disclosed in an application of Fred S. Thornhill, Serial No. 533,043, filed August 23, 1955, now Patent No. 2,940,830.

When the alkali metal silicate used in preparing a finely-divided pigment of the quality contemplated herein is sodium silicate, it should normally have the composition $Na_2O(SiO_2)_x$, where $x$ is at least 2, usually 2 to 4, including fractional numbers, preferably in the range of 3 to 4. The silicate solution generally contains 10 to 100 grams of $SiO_2$ per liter.

The following example illustrates a method of preparing silica having the required properties for use in this invention. Unless otherwise specified, percentages are by weight.

EXAMPLE I

Seventeen thousand gallons of a sodium silicate solution is placed in a 50,000-gallon tank. This solution contains the sodium silicate $Na_2O(SiO_2)_{3.3}$ in an amount sufficient to establish a $Na_2O$ concentration of 20.3 grams per liter. This solution contains no sodium chloride except that minor amount (less than 0.08 percent) usually present in commercial sodium silicate. The solution is held at a temperature of 75° C., plus or minus 5° C. Carbon dioxide gas containing 10.0 to 10.8 percent $CO_2$, the balance being nitrogen and air, is introduced into the solution at gas temperature of 460° C. to 63° C. and at a rate sufficient to provide 1250 cubic feet of the carbon dioxide gas per minute (measured at 760 millimeters' pressure and 0° C.). This gas is introduced directly under a turbo-agitator in a manner to achieve uniform distribution of gas, and the resulting mixture is vigorously agitated. Carbon dioxide introduction is continued at this rate for 8½ hours, at which time about 120 to 140 percent of the theoretical amount of $CO_2$ has been introduced. After this period of 8½ hours, the rate of introduction of carbon dioxide is reduced to 400 cubic feet per minute and the solution is boiled for 1½ hours. The slurry is then treated with sufficient HCl to lower the pH to 7, after which the slurry is filtered and washed.

Chemical and physical data for a typical product produced by the method of the foregoing example are as follows:

| | |
|---|---|
| Bulk density | 10 lbs./cu. ft. |
| Specific gravity | 1.95. |
| Average particle size | 0.22 micron. |
| Color | White. |
| Refractive index | 1.46. |
| Oil absorption (rub-in method) | 170 gms. oil/100 gms. |
| Surface area | 150 sq. m./gms. |
| pH in 5% $H_2O$ suspension | 1.3. |
| Loss at 105° C | 5%. |
| Total loss on ignition @ 1200° C | —10%. |
| $SiO_2$ | 87%. |
| CuO | 0.5%. |
| $Fe_2O_3$ | 0.2%. |
| $Al_2O_3$ | 0.6%. |
| NaCl | 1.0%. |
| Attraction to water | Hydrophilic. |

(Percentages in the above table are by weight.)

The rubber compositions herein contemplated may be prepared simply by milling together in a conventional manner the finely divided silica pigment, the ammonium derivative, accelerators, accelerator activators, rubber, rubber vulcanizing agents and other standard compounding agents, and vulcanizing the resulting composition at the conventional temperatures, for example 287° F. Concentrations ranging from 5 to 100 volumes of silica per hundred volumes of rubber are contemplated. The term "rubber" as used herein is intended to include natural rubber and the synthetic rubbers such as butadiene-styrene copolymers known as "GR–S" rubber which are copolymers of 10 to 60 percent by weight of styrene and 90 to 40 percent by weight of butadiene, butadiene-acrylonitrile copolymers derived by copolymerization of 40 to 90 percent by weight of butadiene, 60 to 10 percent of acrylonitrile, neoprene rubber, isobutylene polymers and copolymers of isobutylene with 0.1 to 4.0 percent by weight of isoprene (based on the weight of isobutylene) or other elastomers prepared by the polymerization of butadiene-1,3, isoprene, piperylene, 2,3-dimethyl butadiene, or 1-chlorobutadiene-1,3 or other comparable polymerizable compounds alone or in admixture with one or more organic monomeric or ethylenic compounds including acrylonitrile, isobutylene, vinyl chloride, vinyl acetate, styrene, methyl methacrylate, methyl alpha chloroacrylate, methyl acrylate, and the like.

According to another embodiment of this invention, the silica may be precoated with the ammonia derivative prior to its incorporation in a rubber composition. This may be effected, for example, by spraying the dry pulverulent silica with the ammonia derivative, or with the ammonia derivative and an activator such as an alkylol amine, alkylene polyamine, or polyhydric alcohol of the type mentioned in the patents cited above. The spraying should be accomplished while tumbling the silica or otherwise agitating it to an extent necessary in order to insure thorough mixing of the ammonia derivative with the silica. Such pre-coating offers definite advantages. In the first place, it permits preparation of a standardized product which may be added to a conventional rubber composition during the rubber compounding. Furthermore, the ammonia derivative (and also the activator if mixed therewith to make the spray) becomes more thoroughly associated with the silica and thus is more effective in combating the disadvantageous properties of the silica than would be the case were these materials simply added to the rubber compound. It is contemplated that amounts of the ammonia derivative up to about 3.5 percent by weight of the filler or more may be incorporated into the silica stock in this manner.

The scope of the invention will be more fully understood by reference to the following illustrative examples. Unless otherwise indicated, the numbers in the formulae represent parts by weight.

EXAMPLE II

Two samples of natural rubber are compounded according to the indicated formulae using silica prepared as described in Example I. The silica has approximately the same physical and chemical properties indicated for the product produced in Example I.

| Formulae | A | B |
|---|---|---|
| #1 Smoked sheets | 100 | 100 |
| Zinc oxide | 5 | 5 |
| Silica | 58.5 | 58.5 |
| Antioxidant 2246 (2,2'-methylene-bis(4-methyl-6-tertiary-butyl phenol) | 1 | 1 |
| Mercaptobenzothiazyl disulfide (MBTS) | 0.8 | 0.8 |
| Diorthotolyl guanidine (DOTG) | 1.2 | 1.2 |
| Sulfur | 3 | 3 |
| Triethanolamine | 1 | 1 |
| Stearic acid | 3 | 3 |
| Ammonium acetate | | 3 |

The rubber compositions so prepared are vulcanized and tested for physical characteristics according to standard accepted methods of testing well established in the rubber art. The results of the tests and cure are tabulated in Table 1.

Table 1

| Compound | Mins. Cure at 287° F. | Modulus, 300% Elong. | Tensile | Elongation | Duro. Hardness |
|---|---|---|---|---|---|
| A | 10 | 470 | 3,030 | 700 | 63 |
|   | 15 | 620 | 3,280 | 660 | 68 |
|   | 30 | 780 | 3,440 | 630 | 74 |
|   | 45 | 860 | 3,590 | 630 | 77 |
| B | 10 | 1,180 | 3,590 | 580 | 81 |
|   | 15 | 1,230 | 3,520 | 560 | 83 |
|   | 30 | 1,150 | 3,420 | 570 | 85 |
|   | 45 | 1,100 | 3,300 | 560 | 85 |

As may be seen from comparing the characteristics of compounds A and B in Table 1, the addition of $NH_4Ac$ to a silica loaded natural rubber compound vulcanized with a MBTS-DOTG combination accelerator resulted in a faster rate of cure, much higher modulus, and higher hardness of the rubber composition.

Another interesting difference between compound A and compound B is that A is completely opaque whereas compound B is transparent. This is a completely unexpected result. From the standpoint of rubber compounding, compounds A and B should not be transparent because their zinc oxide content is too high, they contain too much sulfur, and the acceleration and activation are both wrong for transparency. Inasmuch as the composition of A and B are identical, except for the presence of 3 parts of ammonium acetate in compound B, the transparency of compound B is attributable to the presence of this ammonia derivative. This remarkable effect of the ammonia derivatives disclosed herein of rendering transparent rubber compositions which are ordinarily opaque can be exploited with many advantages in rubber compositions which are intended to be transparent.

As is amply brought out in co-pending application Serial No. 647,478, filed March 21, 1957, now Patent No. 3,014,883, large amounts of zinc oxide and elemental sulfur in silica-filled rubber compositions opacify the compositions. In the past, therefore, when working with transparent rubber formulations, it was customary to keep the quantities of these materials down to a bare minimum. Use of such small quantities of zinc oxide and sulfur, however, had an adverse effect on the effectiveness of the accelerators and on the physical properties of the cured composition. It would be highly advantageous therefore to keep the zinc oxide and sulfur content of the rubber composition high if good transparency would not be sacrificed thereby. This is now possible by use of the ammonia derivatives herein described, as will be more clearly brought out by the following examples:

EXAMPLE III

The following natural rubber compositions are prepared to the indicated formulae using silica pigment prepared according to the procedure in Example I.

| Formulae | c | d | e | f |
|---|---|---|---|---|
| Pale crepe | 100 | 100 | 100 | 100 |
| Zinc oxide | 1 | 1 | 2.5 | 2.5 |
| Silica | 39 | 39 | 39 | 39 |
| Antioxidant 2246 | 2 | 2 | 2 | 2 |
| Mercaptobenzothiazyl disulfide (MBTS) | 1 | 1 | 1 | 1 |
| Methyl zimate (zinc dimethyl dithiocarbamate) | 0.25 | 0.25 | 0.25 | 0.25 |
| Hexamethylene tetramine | 1 | 1 | 1 | 1 |
| Sulfur | 1 | 1 | 1 | 1 |
| Sulfasan R (4,4-dithiodimorpholine) | 1 | 1 | 1 | 1 |
| Ammonium Acetate | | 2 | | 2 |
| Stearic Acid | 1 | 1 | 1 | 1 |
| Mooney scorch [1] | 19 | 21 | 18½ | 18 |

[1] Mins. to 5 point rise above min. viscosity. Small rotor 250° F.

The recipe used for control "c" is disclosed in co-pending application Serial No. 647,478, now Patent No. 3,014,883, as one that will give a good transparent rubber stock. In compound "d" two parts of ammonium acetate were added to the recipe. A third compound "e" was prepared in which the zinc oxide content was increased above that present in the control. Two parts of ammonium acetate were added along with the higher zinc oxide in a fourth compound "f."

The rubber compounds so prepared are vulcanized and tested for physical characteristics using standard methods known in the rubber art. The results of the cure and tests are set forth in Table 2:

*Table 2*

| Compound | Mins. Cure at 287° F. | Mod., 300% E. | Tensile | Elong. | Duro. Hardness A | Tear, lbs./in. | Transparency |
|---|---|---|---|---|---|---|---|
| c | 7.5 | 450 | 3,400 | 710 | 55 | 250 | Transparent. |
|   | 10 | 690 | 4,570 | 710 | 61 | 770 | Do. |
|   | 15 | 670 | 4,560 | 710 | 61 | 770 | Do. |
|   | 30 | 580 | 4,020 | 720 | 64 | 760 | Do. |
| d | 7.5 | 200 | 2,240 | 790 | 52 | 140 | Do. |
|   | 10 | 440 | 4,160 | 750 | 61 | 660 | Do. |
|   | 15 | 430 | 4,180 | 760 | 62 | 630 | Do. |
|   | 30 | 340 | 3,480 | 760 | 65 | 690 | Do. |
| e | 7.5 | 530 | 3,690 | 710 | 56 | 600 | Opaque. |
|   | 10 | 760 | 4,860 | 720 | 61 | 750 | Do. |
|   | 15 | 780 | 4,730 | 720 | 61 | 740 | Do. |
|   | 30 | 690 | 4,420 | 730 | 62 | 740 | Do. |
| f | 7.5 | 630 | 4,700 | 720 | 61 | 780 | Transparent. |
|   | 10 | 670 | 5,020 | 750 | 64 | 810 | Do. |
|   | 15 | 630 | 4,500 | 700 | 63 | 850 | Do. |
|   | 30 | 570 | 4,440 | 730 | 65 | 800 | Do. |

The addition of ammonium acetate (compound "d") very definitely improved the transparency of the control (compound "c"). This was obvious when looking through sheets of compound "c" and "d" of equal thickness at a distant object. When so tested, the sheet of compound "d" containing ammonium acetate was much clearer and was free from a slight haze, which in the control sheet impaired the outline of an object not in direct contact with the sheet.

As is apparent from Table 2, the physical properties of compound "e," which contained a higher amount of zinc oxide than compound "c," were definitely improved by the higher zinc oxide concentration. In making this improvement in strength characteristics, however, loss of transparency resulted, and the cured stock was opaque. Compound "f" contained the same quantity of zinc oxide as did compound "e," but additionally contained 2.5 p.h.r. (parts per hundred rubber) of NH₄Ac. As can be seen from Table 2 not only were the improved strength characteristics of compound "e" preserved by compound "f," but, additionally, compound "f" had a transparency at least as good as compound "c."

EXAMPLE IV

The following natural rubber compositions are prepared using silica pigment prepared according to the procedure in Example I.

| Formulae | g | h | i |
|---|---|---|---|
| #1X Pale Crepe | 100 | 100 | 100 |
| Zinc oxide | 1 | 1 | 2.5 |
| Silica | 39 | 39 | 39 |
| Antioxidant 2246 | 2 | 2 | 2 |
| Mercaptobenzothiazyl disulfide (MBTS) | 1 | 1 | 1 |
| Methyl Zimate | 0.25 | 0.25 | 0.25 |
| Hexamethylene tetramine | 1 | 1 | 1 |
| Sulfur | 2.5 | 2.5 | 2.5 |
| Ammonium acetate | | 2 | 2 |
| Stearic acid | 1 | 1 | 1 |
| Mooney scorch [1] | 26½ | 11¼ | 20 |

[1] Mins. to 5 point rise above min. viscosity. Small rotor 250° F.

The rubber compounds so prepared are vulcanized and tested for physical characteristics using standard methods known in the rubber art. The results of the tests are tabulated in Table 3.

*Table 3*

| Compound | Mins. Cure at 287° F. | Mod., 300% E. | Tensile | Elong. | Duro. Hard. | Tear, lbs./in. | Transparency |
|---|---|---|---|---|---|---|---|
| g | 7.5 | 100 | 1,320 | 810 | 42 | 90 | Transparent. |
|   | 10 | 250 | 2,440 | 730 | 45 | 170 | Do. |
|   | 15 | 440 | 3,250 | 700 | 53 | 260 | Do. |
|   | 30 | 530 | 3,440 | 680 | 58 | 220 | Do. |
|   | 45 | 560 | 3,420 | 700 | 60 | 220 | Do. |
| h | 7.5 | 440 | 3,280 | 690 | 54 | 660 | Do. |
|   | 10 | 460 | 3,420 | 690 | 56 | 770 | Do. |
|   | 15 | 500 | 3,540 | 700 | 58 | 600 | Do. |
|   | 30 | 460 | 3,490 | 720 | 63 | 520 | Do. |
|   | 45 | 410 | 3,330 | 730 | 60 | 430 | Do. |
| i | 7.5 | 860 | 4,810 | 670 | 57 | 850 | Do. |
|   | 10 | 890 | 4,650 | 640 | 57 | 830 | Do. |
|   | 15 | 890 | 4,750 | 660 | 61 | 810 | Do. |
|   | 30 | 790 | 4,460 | 670 | 60 | 790 | Do. |
|   | 45 | 760 | 4,270 | 660 | 60 | 700 | Do. |

Compound "c" in Example III, as has already been noted, constitutes a recipe known to produce a transparent natural rubber which is disclosed in co-pending application Serial No. 647,478. This recipe holds the elemental sulfur to a low level by using an organic sulfide, i.e., Sulfason R (dithiodimorpholine) in addition to elemental sulfur to supplement the sulfur content of the composition. The disadvantage of this recipe, however, is that the organic sulfide is relatively expensive compared to elemental sulfur, and accordingly increases total compound costs.

In compound "g" above, only elemental sulfur is used. The adverse effect of high elemental sulfur content on the strength characteristics of the transparent rubber composition is apparent from comparing the physical characteristics of compounds "c" and "g" in Tables 2 and 3. Thus, use of elemental sulfur alone in formulation "g" in place of the elemental sulfur and an organic sulfide in formulation "g" caused serious sacrifice of physical properties of compound "g."

Addition of ammonium acetate in compound "h" to the recipe of compound "g" increased the transparency, and additionally raised the tear resistance, as is apparent from comparing compounds "g" and "h" in Table 3.

In compound "i," the zinc content of the standard formulation was raised in addiiton to adding ammonium acetate. This had the effect of increasing the strength characteristics of the composition, while sacrificing none of the transparency.

Compound "i" shows that it is possible, by use of the ammonia derivatives disclosed herein, to obtain good silica-loaded transparent natural rubber compounds having high strength characteristics and high rates of cure using elemental sulfur and zinc oxide at normal levels, and omitting high priced organic sulfides. Inasmuch as compound "i" has better properties, equal transparency, equal scorch rate, and considerably lower cost than compound "c" in Example III, the advantages of using the ammonia derivatives disclosed herein are immediately apparent.

The term "transparent" as used in Examples III and IV, it should be noted, refers to vulcanizates having an opacity of below 50 percent. Such opacity is determined with a Hunter Reflectometer, as has been hereinabove described.

EXAMPLE V

The run is made to determine the effect on rate of cure and physical characteristics of the rubber composition with increasing amounts of ammonia derivatives.

Natural rubber compositions are prepared according to the following formulae using silica pigment prepared by the procedure described in Example I:

| Formulae | 1 | 2 | 3 | 4 | 5 |
|---|---|---|---|---|---|
| #1 Smoked sheets | 100 | 100 | 100 | 100 | 100 |
| Zinc oxide | 5 | 5 | 5 | 5 | 5 |
| Silica | 58.5 | 58.5 | 58.5 | 58.5 | 58.5 |
| Antioxidant 2246 | 1 | 1 | 1 | 1 | 1 |
| Methylbenzothiazyl disulfide (MBTS) | 0.8 | 0.8 | 0.8 | 0.8 | 0.8 |
| Diorthotolyl guanadine (DOTG) | 1.2 | 1.2 | 1.2 | 1.2 | 1.2 |
| Sulfur | 3 | 3 | 3 | 3 | 3 |
| Triethanolamine | 1 | 1 | 1 | 1 | 1 |
| Stearic acid | 3 | 3 | 3 | 3 | 3 |
| Ammonium acetate | | 3 | 5 | 10 | 15 |

The rubber compounds so prepared are vulcanized and tested for physical characteristics using standard methods known in the rubber art. The results of the tests are set forth in Table 4:

Table 4

| Compound | Mins. Cure at 287° F. | Mod., 300% E. | Tensile | Elong. | Duro.A Hard. | Tear lbs./in. |
|---|---|---|---|---|---|---|
| 1 | 5 | 550 | 2,870 | 650 | 62 | 510 |
|   | 10 | 800 | 3,440 | 640 | 69 | 700 |
|   | 15 | 960 | 3,410 | 610 | 72 | 730 |
| 2 | 5 | 870 | 3,700 | 650 | 71 | 730 |
|   | 10 | 1,050 | 3,270 | 580 | 76 | 630 |
|   | 15 | 1,090 | 3,150 | 550 | 79 | 590 |
| 3 | 5 | 620 | 3,520 | 680 | 68 | 640 |
|   | 10 | 750 | 3,330 | 630 | 74 | 630 |
|   | 15 | 770 | 3,400 | 620 | 76 | 570 |
| 4 | 5 | 370 | 2,830 | 710 | 60 | 610 |
|   | 10 | 510 | 3,040 | 680 | 67 | 570 |
|   | 15 | 540 | 3,000 | 650 | 69 | 510 |
| 5 | 5 | 260 | 2,640 | 780 | 57 | 540 |
|   | 10 | 380 | 2,950 | 710 | 63 | 490 |
|   | 15 | 420 | 2,840 | 680 | 66 | 460 |

As may be seen from Table 4, as the ammonium acetate content goes from 3 up to 5 parts by weight per hundred parts by weight of rubber, the desirable higher modulus of the compound is lost. As the ammonium acetate content is further increased from 5 to 10 and then to 15, the faster rate of cure, higher modulus, and higher hardness of compound "2" all disappear, and compounds "4" and "5" containing 10 and 15 parts of ammonium acetate, respectively, are not as good as control compound "1."

EXAMPLE VI

This example was run to illustrate the effect of other ammonia derivatives on the state of cure of silica-loaded rubber compounds.

Rubber compositions having the recipes indicated below are prepared using silica pigment made according to the procedure outlined in Example I. Ammonia bicarbonate was used as the ammonia derivative. Because this material gives off ammonia as well as carbon dioxide at vulcanizing temperatures, it was necessary to use a carbon dioxide acceptor in the composition in order to prevent porosity in the finished compound. In the formulations below, magnesium oxide was used as the carbon dioxide acceptor, although it is obvious that other carbon dioxide acceptors could have been used equally as well.

| Formulae | F | G | H |
|---|---|---|---|
| #1 Smoked sheets | 100 | 100 | 100 |
| Zinc oxide | 5 | 5 | 5 |
| Magnesium oxide | | | 5 |
| Silica | 58.5 | 58.5 | 58.5 |
| Antioxidant 2246 | 1 | 1 | 1 |
| Mercaptobenzothiazyl disulfide (MBTS) | 0.8 | 0.8 | 0.8 |
| Diorthotolyl guanidine (DOTG) | 1.2 | 1.2 | 1.2 |
| Sulfur | 3 | 3 | 3 |
| Triethanolamine | 1 | 1 | 1 |
| Stearic acid | 3 | 3 | 3 |
| Ammonium bicarbonate | | | 3 |

The rubber formulations so prepared are vulcanized and tested for phsyical characteristics using standard procedures known in the rubber art at specified times of cure. The results of the tests are set forth in Table 5:

Table 5

| Compound | Mins. Cure at 287° F. | Mod., 300% E. | Tensile | Elong. | Duro. Hard. |
|---|---|---|---|---|---|
| F | 10 | 510 | 2,290 | 700 | 58 |
|   | 15 | 600 | 3,240 | 680 | 65 |
|   | 30 | 790 | 3,470 | 640 | 69 |
|   | 45 | 850 | 3,500 | 620 | 73 |
| G | 10 | 1,020 | 3,890 | 640 | 68 |
|   | 15 | 1,090 | 3,830 | 620 | 72 |
|   | 30 | 1,260 | 3,780 | 590 | 74 |
|   | 45 | 1,130 | 3,730 | 620 | 75 |
| H | 10 | 1,240 | 3,750 | 580 | 76 |
|   | 15 | 1,470 | 3,550 | 560 | 81 |
|   | 30 | 1,520 | 3,560 | 550 | 82 |
|   | 45 | 1,520 | 3,280 | 510 | 83 |

As is apparent from Table 5, the use of ammonium bicarbonate considerably enhances the state of cure of the rubber composition, as is indicated by the faster rate of cure and increased strength characteristics of compound H as compared with either compound F or G.

EXAMPLE VII

This example is run to further illustrate the types of ammonia derivatives which may be used to enhance the state of cure of silica-filled natural rubber compositions. Formulations using the indicated ammonia salt, thiozole-guanidine acceleration and triethanolamine activation are prepared. The silica pigment used is made according to the procedure outlined in Example I.

| Formulae | I | J | K | L | M |
|---|---|---|---|---|---|
| #1 Smoked sheets | 100 | 100 | 100 | 100 | 100 |
| Zinc | 5 | 5 | 5 | 5 | 5 |
| Silica | 58.5 | 58.5 | 58.5 | 58.5 | 58.5 |
| Antioxidant 2246 | 1 | 1 | 1 | 1 | 1 |
| Mercaptobenzothiazyl disulfide (MBTS) | 0.8 | 0.8 | 0.8 | 0.8 | 0.8 |
| Diorthotolyl guanidine (DOTG) | 1.2 | 1.2 | 1.2 | 1.2 | 1.2 |
| Sulfur | 3 | 3 | 3 | 3 | 3 |
| Triethanolamine | 1 | 1 | 1 | 1 | 1 |
| Stearic Acid | 2 | 2 | 2 | 2 | 2 |
| HMDA Carbamate [1] | | 3 | | | |
| Trimethyl benzly ammonium chloride | | | 3 | | |
| Acetamide | | | | 3 | |
| Succinamide | | | | | 3 |

[1] Manufactured by Kellogg Company and described as an "inner salt" of omega-amino substituted hexyl carbamic acid."

The formulations thus prepared are vulcanized and tested for physical characteristics using standard procedures known in the rubber art. The results of the tests are set forth in Table 6.

Table 6

| Compound | Mins. Cure at 287° F. | Mod., 300% E. | Tensile | Elong. | Duro. Hard. | Tear lbs./in. |
|---|---|---|---|---|---|---|
| I | 10 | 480 | 3,000 | 700 | 67 | 430 |
|   | 15 | 580 | 3,220 | 680 | 68 | 590 |
|   | 30 | 790 | 3,270 | 620 | 74 | 690 |
|   | 45 | 880 | 3,480 | 620 | 78 | 760 |
|   | 60 | 920 | 3,540 | 610 | 79 | 740 |
| J | 10 | 1,390 | 3,770 | 570 | 81 | 800 |
|   | 15 | 1,500 | 3,830 | 560 | 83 | 780 |
|   | 30 | 1,500 | 3,770 | 560 | 82 | 700 |
|   | 45 | 1,440 | 3,730 | 560 | 82 | 670 |
|   | 60 | 1,370 | 3,770 | 570 | 86 | 770 |
| K | 10 | 1,120 | 3,980 | 630 | 77 | 790 |
|   | 15 | 1,250 | 3,950 | 620 | 78 | 760 |
|   | 30 | 1,370 | 3,750 | 550 | 83 | 720 |
|   | 45 | 1,360 | 3,620 | 540 | 84 | 710 |
|   | 60 | 1,280 | 3,550 | 560 | 85 | 680 |
| L | 10 | 1,010 | 3,960 | 640 | 76 | 800 |
|   | 15 | 1,110 | 4,110 | 650 | 81 | 790 |
|   | 30 | 1,220 | 3,880 | 600 | 83 | 730 |
|   | 45 | 1,240 | 3,810 | 590 | 84 | 690 |
|   | 60 | 1,220 | 3,820 | 600 | 86 | 650 |
| M | 10 | 850 | 3,770 | 650 | 69 | 780 |
|   | 15 | 1,050 | 3,780 | 620 | 76 | 790 |
|   | 30 | 1,250 | 3,780 | 600 | 76 | 770 |
|   | 45 | 1,250 | 3,680 | 560 | 79 | 690 |
|   | 60 | 1,190 | 3,620 | 560 | 81 | 660 |

As is shown by Table 6, acetamide, succinamide, trimethyl benzyl ammonium chloride and Kellogg Company's HMDA Carbamate, which is described as an "inner salt of omega-amino substituted hexyl carbamic acid" all enhance the state of cure of silica-loaded natural rubber compounds.

EXAMPLE VIII

This example was run to illustrate that the action of the ammonia derivative is not confined to natural rubber compounds vulcanized with the thiozole-guanidine combinations. Formulations are made using thiozole-thiuram acceleration and alkylol amine activation. The silica pigment used is prepared according to the procedure outlined in Example I.

| Formulae | C | D | E |
|---|---|---|---|
| #1 Smoked sheets | 100 | 100 | 100 |
| Zinc oxide | 5 | 5 | 5 |
| Magnesium oxide |  | 3 | 3 |
| Silica | 58.5 | 58.5 | 58.5 |
| Antioxidant 2246 | 1 | 1 | 1 |
| Mercaptobenzothiazyl sulfide | 1 | 1 | 1 |
| Tetramethyl thiuram disulfide | 0.25 | 0.25 | 0.25 |
| Sulfur | 3 | 3 | 3 |
| Triethanolamine | 2 | 2 | 2 |
| Stearic acid | 3 | 3 | 3 |
| Ammonium acetate |  |  | 2 |

The formulations thus prepared are vulcanized and tested for physical characteristics using standard procedures known in the rubber art. The results of the tests are tabulated in Table 7.

Table 7

| Compound | Mins. Cure at 287° F. | Mod., 300% E. | Tensile | Elong. | Duro. Hard. | Tear |
|---|---|---|---|---|---|---|
| C | 5 | 400 | 2,760 | 740 | 62 | 200 |
|   | 10 | 600 | 3,280 | 680 | 67 | 230 |
|   | 15 | 580 | 3,070 | 680 | 68 | 250 |
|   | 30 | 740 | 3,310 | 640 | 69 | 280 |
|   | 45 | 780 | 3,260 | 620 | 73 | 560 |
| D | 5 | 800 | 3,320 | 620 | 64 | 680 |
|   | 10 | 970 | 3,560 | 610 | 69 | 690 |
|   | 15 | 960 | 3,380 | 580 | 70 | 720 |
|   | 30 | 1,010 | 3,550 | 610 | 74 | 730 |
|   | 45 | 960 | 3,230 | 600 | 75 | 660 |
| E | 5 | 1,420 | 4,150 | 610 | 73 | 760 |
|   | 10 | 1,510 | 3,930 | 590 | 77 | 690 |
|   | 15 | 1,500 | 3,890 | 590 | 75 | 740 |
|   | 30 | 1,430 | 3,830 | 580 | 75 | 660 |
|   | 45 | 1,350 | 3,600 | 570 | 76 | 620 |

The very great increases in modulus, tensile strength, and hardness exhibited by compound E as compared to control compound C show that the addition of the ammonia derivative produces a much tighter state of cure. Further, these effects are much greater than those produced by simply adding an alkaline material such as magnesium oxide, as can be seen by comparing compound E with compound D.

The effect of the ammonia derivatives taught herein in improving the rate of cure and physical properties of silica-loaded rubber compounds is not limited to those based on natural rubber. The same unexpected results arise when the ammonia derivatives are added to formulations of synthetic rubbers or elastomers, as is shown more clearly by the following examples.

EXAMPLE IX

Formulations are prepared with a butadienestyrene copolymer, using thiazole-guanidine acceleration and alkylol amine activation. The silica pigment was made according to the process outlined in Example I.

| Formulae | R | S |
|---|---|---|
| SB R-1502 (butadiene-styrene copolymer containing 23.5 percent by weight, basis of polymer, of chemically bound styrene) | 100 | 100 |
| Zinc oxide | 5 | 5 |
| Silica | 50 | 50 |
| Antioxidant 2246 | 2 | 2 |
| Mercaptobenzothiazyl disulfide (MBTS) | 0.75 | 0.75 |
| Diorthotolyl guanidine (DOTG) | 1.5 | 1.5 |
| Sulfur | 3 | 3 |
| Triethanolamine | 1 | 1 |
| Stearic acid | 1 | 1 |
| Ammonium acetate |  | 2 |

The formulations thus prepared are vulcanized and tested for physical characteristics using standard procedures known in the rubber art, the testing being carried out on specimens at various times of cures. Table B tabulates the data obtained:

Table 8

| Compound | Mins. Cure at 287° F. | Mod., 300% E. | Tensile | Elong. | Duro. Hard. |
|---|---|---|---|---|---|
| R | 10 | (1) | (1) | (1) | (1) |
|   | 15 | 270 | 2,480 | 860 | 60 |
|   | 20 | 420 | 2,880 | 720 | 62 |
|   | 30 | 560 | 2,710 | 620 | 65 |
| S | 5 | 340 | 2,570 | 810 | 66 |
|   | 10 | 730 | 2,950 | 580 | 70 |
|   | 15 | 680 | 3,020 | 580 | 72 |
|   | 20 | 770 | 2,920 | 560 | 72 |
|   | 30 | 770 | 2,670 | 520 | 72 |

[1] Undercured.

The much faster rate of cure, higher modulus, higher tensile and higher hardness, all of which indicate a tighter state of cure, are readily apparent from a comparison of compound S, which contained a small amount of the ammonium derivative, and compound R, which served as a control.

The amount of permanent set retained by vulcanized elastomers is recognized as a good measure of their state of cure. This refers to the ability of the elastomer to recover its original dimensions after being stretched to a definite elongation and held in the distorted position for a definite length of time.

Butyl rubber is notorious for its retention of a high degree of set after deformation. This occurs because butyl rubber has only a small amount of saturation and, consequently, is difficult to cure.

The addition of an ammonia derivative of the type disclosed herein to butyl compounds markedly reduces their permanent set, as is clear from the following example.

EXAMPLE X

Butyl rubber compositions having the following formulations are made:

| Formulae | T | U | V | W |
|---|---|---|---|---|
| Butyl 365a [1] | 100 | 100 | 100 | 100 |
| Zinc oxide | 5 | 5 | 5 | 5 |
| Silica | 40 | 40 | 40 | 40 |
| Methyl Tuads (tetramethylthiuram disulfide) | 2 | 2 | 2 | 2 |
| Sulfur | 1 | 1 | 2 | 2 |
| Sulfasan R (Dithiodimorpholine) | 1.5 | 1.5 | | |
| Diethylene glycol | 2.5 | 2.5 | 2.5 | 2.5 |
| KP-140 (tributoxy ethyl phosphate) | 1 | 1 | 1 | 1 |
| Paraffin | 0.75 | 0.75 | 0.75 | 0.75 |
| Ammonium acetate | | 3 | | 3 |

[1] Isobutylene-isoprene copolymer having minor amount of bound isoprene, polymerized with catalyst at minus 150° F.

The formulations prepared are vulcanized and tested for physical characteristics using standard procedures well known in the rubber art. The results of the tests are tabulated in Table 9, and clearly show that the addition of the ammonium derivative to butyl compounds markedly reduces their permanent set, indicating that the ammonium derivatives has had a beneficial effect on the state of cure.

*Table 9*

| Compund | Mins. Cure at 320° F. | Percent Permanent Set at 75% Ult. Elong. |
|---|---|---|
| T | 7.5 | 54 |
|   | 10 | 53 |
|   | 15 | 49 |
|   | 20 | 50 |
|   | 30 | 48 |
| U | 7.5 | 43 |
|   | 10 | 40 |
|   | 15 | 36 |
|   | 20 | 35 |
|   | 30 | 33 |
| V | 7.5 | 62 |
|   | 10 | 58 |
|   | 15 | 55 |
|   | 20 | 54 |
|   | 30 | 54 |
| W | 7.5 | 49 |
|   | 10 | 46 |
|   | 15 | 40 |
|   | 20 | 39 |
|   | 30 | 39 |

One of the important characteristisc of the finely divided silica pigments hereinabove described from a formulation standpoint is pH. It has been known that silica pigments having a low pH are better dispersed than high pH materials. It would be very desirable, therefore, to incorporate the silica pigment into the rubber composition at an acid pH if this would not cause an adverse effect on vulcanization. Heretofore, however, silica stock having a low pH was not generally suited for use as a rubber filler because of the slow rate of cure of the resulting rubber compound.

The silica pigment used in Examples II to X, inclusive, it should be noted, was neutral or had a slightly alkaline pH, i.e., 7. to 7.3. The pH referred to was measured by forming a 5% suspension of the silica in water and measuring the pH of the suspension. The following example shows the effect on a rubber composition loaded with silica pigment having an acid pH when treated with the ammonia derivatives disclosed herein.

EXAMPLE XI

Finely divided silica pigment was prepared according to the following method which is disclosed in an application of Kissling et al., Serial No. 374,432:

Seventeen thousand gallons of a sodium silicate solution is placed in a 50,000 gallon tank. This solution contains the sodium silicate $Na_2O(SiO_2)_{3.3}$ in amount sufficient to establish an $Na_2O$ concentration of 20.3 grams per liter. It contains no sodium chloride except the minor amount (less than 0.08 percent by weight) usually present in commercial sodium silicate. The solution is held at a temperature of 167° F. plus or minus 5° F. Carbon dioxide gas containing 10.0 to 10.8 percent by volume of carbon dioxide, the balance being nitrogen and air, is introduced into the solution at a gas temperature of 115° F. to 145° F. at a rate sufficient to provide 1250 cubic feet of the carbon dioxide gas per minute, measured at 760 millimeters' pressure and 0° C. This gas is introduced directly into a turbo-agitator in a manner to achieve uniform distribution of the gas, and the mixture is vigorously agitated. Carbon dioxide introduction is continued at this rate for 8½ hours, at which time about 120 to 140 percent of the theoretical amount of carbon dioxide has been introduced. After this period of 8½ hours, the rate of introduction of carbon dioxide is reduced to 400 cubic feet per minute and the solution is boiled for 1½ hours.

The resulting silica slurry, which has a pH of about 9.9, is filtered and the filter cake washed twice with water. The final filter cake contains about 20 percent by weight of solids. A sulphonated polystyrene cation exchanger in the acid form having a particle size of 60 to 70 mesh is mixed with the filter cake in the proportion of 5 grams of filter cake per gram of resin. Enough water is added to reduce the silica solids content to about 15 percent by weight on the basis of the silica and water in the mixture. Upon stirring, the mixture thins out to a fluid slurry. The resin is allowed to settle out and the slurry having a pH of about 2.0 is spray-dried.

Silica produced by the above method has the following typical chemical and physical characteristics;

| | |
|---|---|
| Color | White. |
| Bulk density | 3 lb./cu. ft. |
| Specific gravity | 1.95. |
| Refractive index | 1.445–1.465. |
| Average particle size | 0.22 micron. |
| Surface area | 160 sq. meter/gram. |
| pH in 5% aqueous suspension | 4.5. |
| Loss at 105° C | 4.5%. |
| Ignition loss @ 1200° C | 10%. |
| $SiO_2$ | 88%. |
| NaCl | 0.04%. |
| $Na_2SO_4$ | 0.04%. |
| Oil absorption (linseed oil) | 145–160 gms. |

Using silica which was prepared in the above manner, and which had a pH of 4.5 (measured in a 5% suspension of the silica in water) natural rubber formulations having the following recipes are prepared:

| Formulae | N | O |
|---|---|---|
| #1 Smoked sheets | 100 | 100 |
| Zinc oxide | 5 | 5 |
| Silica | 58.5 | 58.5 |
| Antioxidant 2246 | 1 | 1 |
| Mercaptobenzothiazyl disulfide (MBTS) | 1.2 | 1.2 |
| Diorthotolyl guanidine (DOTG) | 1.8 | 1.8 |
| Sulfur | 3 | 3 |
| Stearic acid | 3 | 3 |
| Ammonium acetate | | 3 |

The above formulations are vulcanized and tested for physical characteristics following standard procedures well known in the rubber art. The results of these tests are tabulated in Table 10.

Table 10

| Compound | Mins. Cure at 287° F. | Mod. 300% E. | Tensile | Elong. | Duro. Hard. | Tear |
|---|---|---|---|---|---|---|
| N | 10 | 340 | 2,280 | 700 | 63 | 200 |
|   | 15 | 450 | 2,970 | 710 | 63 | 390 |
|   | 30 | 650 | 3,300 | 670 | 69 | 640 |
|   | 45 | 730 | 3,380 | 670 | 73 | 730 |
|   | 60 | 780 | 3,500 | 650 | 74 | 670 |
| O | 10 | 1,100 | 3,740 | 600 | 81 | 690 |
|   | 15 | 1,150 | 3,750 | 600 | 83 | 660 |
|   | 30 | 1,090 | 3,510 | 590 | 85 | 610 |
|   | 45 | 1,010 | 3,520 | 600 | 86 | 570 |
|   | 60 | 970 | 3,420 | 600 | 88 | 630 |

ABRASION LOSS, GOODYEAR ANGLE ABRADER

[Cc. loss per 1600 revolutions]

| Compound | Cure at 280° F.[1] | Abrasion Loss |
|---|---|---|
| N | 60 | 8.4 |
| O | 60 | 7.1 |

[1] Samples aged 96 hours at 121° C.

It is apparent from Table 10 that the addition of ammonium acetate greatly increased the rate of cure, modulus and hardness and definitely improved tensile strength and abrasion resistance of the rubber compositions containing the acid pH silica stock. The effect of low pH silica stock on the state of cure not containing the ammonia derivatives taught herein is apparent from a comparison of compound N above with compound A in Example II.

The following examples further demonstrate the method in which the ammonium salts may be added to the rubber composition:

EXAMPLE XII

Finely divided silica prepared as in Example I is mixed with 3 parts by weight (based upon the weight of the pigment) of ammonium acetate. This coated product is milled with the rubber composition set forth in Example II, omitting the ammonium acetate from the recipe. Results comparable to those set forth in Example II are obtained.

EXAMPLE XIII

Finely divided silica prepared as in Example I is mixed with 3.0 parts by weight (based upon the weight of the pigment) of ammonium acetate and 1 part by weight (based upon the weight of the pigment) of triethanol amine. The coated product is milled with the rubber composition set forth in Example II, omitting ammonium acetate-triethanol amine from the recipe. Results comparable to those set forth in Example II are obtained.

Although the present invention has been described with reference to specific details of certain embodiments thereof, it is not intended that such details shall be regarded as limitations except insofar as such limitations are included in the following claims.

This application is a continuation-in-part of application Serial No. 647,478, filed March 21, 1957.

I claim:

1. The process of producing a transparent vulcanizate which comprises mixing a vulcanizable rubber with a reinforcing finely-divided hydrated silica having an average ultimate particle size of 0.01 to 0.05 micron and an index of refraction of 1.450 to 1.465, a vulcanizing agent and an onium compound from the group consisting of ammonium salts and quaternary ammonium salts, and vulcanizing said mixture whereby to form a vulcanizate having an opacity below 50 percent, which opacity is measured as 100 times the ratio of green light reflectance from a 0.075 inch sheet of said vulcanizate over a black background to the reflectance obtained from such sheet over a white background.

2. The process of claim 1 wherein the onium compound is ammonium acetate.

3. The process of claim 1 wherein the onium compound is ammonium bicarbonate.

4. The process of claim 1 wherein the onium compound is trimethylbenzylammonium chloride.

5. The process of producing a transparent vulcanizate which comprises mixing a vulcanizable rubber from the group consisting of natural rubber, butadiene-styrene copolymers, butadiene-acrylonitrile copolymers, and isobutylene-isoprene copolymers with a reinforcing finely-divided hydrated silica having an average ultimate particle size of from 0.01 to 0.05 micron and an index of refraction of 1.450 to 1.465, a sulphur containing vulcanizing agent and an onium compound from the group consisting of ammonium salt and quaternary ammonium salts, and vulcanizing said mixture whereby to form a vulcanizate having an opacity below 50 percent, which opacity is measured as 100 times the ratio of green light reflectance from a 0.075 inch sheet of said vulcanizate over a black background to the reflectance obtained from said sheet over a white background.

6. The process of claim 5 wherein the onium compound is ammonium acetate.

7. The process of claim 5 wherein the onium compound is ammonium bicarbonate.

8. The process of claim 5 wherein the onium compound is trimethylbenzylammonium chloride.

9. The process of producing a transparent vulcanizate which comprises mixing a vulcanizable rubber from the group consisting of natural rubber, butadiene-styrene copolymers, butadiene-acrylonitrile copolymers, and isobutylene-isoprene copolymers with a reinforcing finely-divided hydrated silica having an average ultimate particle size of from 0.01 to 0.05 micron and an index of refraction of 1.450 to 1.465, a sulphur containing vulcanizing agent, zinc oxide in an amount of up to 5 parts by weight per 100 parts by weight of said rubber, and an onium compound from the group consisting of ammonium salt and quaternary ammonium salts, and vulcanizing said mixture whereby to form a vulcanizate having an opacity below 50 percent, which opacity was measured as 100 times the ratio of green light reflectance from a 0.075 inch sheet of said vulcanizate over a black background to the reflectance obtained from said sheet over a white background.

10. The process of producing a transparent vulcanizate which comprises mixing a vulcanizable rubber from the group consisting of natural rubber, butadiene-styrene copolymers, butadiene-acrylonitrile copolymers, and isobutylene-isoprene copolymers with a reinforcing finely-divided hydrated silica having an average ultimate particle size of from 0.01 to 0.05 micron and an index of refraction of 1.450 to 1.465, sulphur in an amount up to 3 parts per 100 parts by weight of rubber, up to 5 parts by weight of zinc oxide per 100 parts by weight of rubber, a small amount of a thiazole accelerator, a small amount of an amine activator, and an onium compound from the group consisting of ammonium salts and quaternary ammonium salts, and heating the mixture to vulcanization temperature whereby to produce a vulcanizate having an opacity below 50 percent, which opacity is measured as 100 times the ratio of green light reflectance from a 0.075 inch sheet of said vulcanizate over a black background to the reflectance obtained from said sheet over a white background.

11. The process of claim 10 wherein a thiocarbamate accelerator is added to the mixture.

References Cited in the file of this patent

UNITED STATES PATENTS

| | | |
|---|---|---|
| 2,692,869 | Pechukas | Oct. 26, 1954 |
| 2,692,870 | Pechukas | Oct. 26, 1954 |
| 2,692,871 | Pechukas | Oct. 26, 1954 |
| 2,697,699 | Cohn | Dec. 21, 1954 |
| 2,919,260 | Augustin | Dec. 21, 1959 |
| 3,014,883 | Wolf | Dec. 26, 1961 |